(12) United States Patent
Yamaguchi

(10) Patent No.: US 9,364,983 B2
(45) Date of Patent: Jun. 14, 2016

(54) INJECTION APPARATUS

(71) Applicant: KABUSHIKI KAISHA TOYOTA JIDOSHOKKI, Kariya-shi, Aichi-ken (JP)

(72) Inventor: Kazuyuki Yamaguchi, Kariya (JP)

(73) Assignee: KABUSHIKI KAISHA TOYOTA JIDOSHOKKI, Aichi-ken (JP)

(*) Notice: Subject to any disclaimer, the term of this patent is extended or adjusted under 35 U.S.C. 154(b) by 126 days.

(21) Appl. No.: 14/351,624

(22) PCT Filed: Oct. 2, 2012

(86) PCT No.: PCT/JP2012/075522
§ 371 (c)(1),
(2) Date: Apr. 14, 2014

(87) PCT Pub. No.: WO2013/058101
PCT Pub. Date: Apr. 25, 2013

(65) Prior Publication Data
US 2014/0255536 A1    Sep. 11, 2014

(30) Foreign Application Priority Data

Oct. 19, 2011    (JP) .................................. 2011-230017

(51) Int. Cl.
*B22D 17/32*    (2006.01)
*B29C 45/18*    (2006.01)
(Continued)

(52) U.S. Cl.
CPC ................ *B29C 45/18* (2013.01); *B22D 17/32* (2013.01); *B29C 45/531* (2013.01); *B29C 45/82* (2013.01); *B29C 2045/824* (2013.01)

(58) Field of Classification Search
CPC .............................. B22D 17/32; B29C 45/531
USPC .................................................. 164/312, 113
See application file for complete search history.

(56) References Cited

U.S. PATENT DOCUMENTS

| 2,233,521 A | 3/1941 | Ernst et al. |
| 5,207,267 A | 5/1993 | Iwamoto et al. |
| 5,662,159 A | 9/1997 | Iwamoto et al. |

(Continued)

FOREIGN PATENT DOCUMENTS

| CN | 1509829 A | 7/2004 |
| CN | 1857831 A | 11/2006 |

(Continued)

OTHER PUBLICATIONS

International Preliminary Report on Patentability, dated Apr. 22, 2014. Issued by the International Searching Authority in counterpart application No. PCT/JP2012/075522.

(Continued)

*Primary Examiner* — Kevin P Kerns
(74) *Attorney, Agent, or Firm* — Sughrue Mion, PLLC

(57) ABSTRACT

An injection apparatus includes a pressure accumulating portion, which is connected to an injection cylinder, and a speed reduction mechanism, which reduces the speed of the injection cylinder arranged in the injection apparatus. The speed reduction mechanism includes an actuating member, which moves integrally with a rod of an injection cylinder rod, and a restriction member, which is arranged in a flow passage for draining or supplying hydraulic oil from or to the injection cylinder, and variably narrows the flow passage in conjunction with movement of the actuating member.

5 Claims, 4 Drawing Sheets

(51) Int. Cl.
*B29C 45/53* (2006.01)
*B29C 45/82* (2006.01)

(56) References Cited

U.S. PATENT DOCUMENTS

| | | | |
|---|---|---|---|
| 5,887,641 A | 3/1999 | Iwamoto et al. | |
| 9,056,418 B2* | 6/2015 | Yamaguchi | B22D 17/32 |
| 9,248,596 B2* | 2/2016 | Yamaguchi | B22D 17/32 |
| 2006/0191347 A1 | 8/2006 | Uchiyama et al. | |
| 2009/0242161 A1 | 10/2009 | Uchida et al. | |
| 2010/0000699 A1 | 1/2010 | Uchida et al. | |

FOREIGN PATENT DOCUMENTS

| | | | |
|---|---|---|---|
| CN | 101104199 A | 1/2008 | |
| EP | 2295171 A1 | 3/2011 | |
| GB | 2025814 A | 1/1980 | |
| JP | 56-157309 A | 12/1981 | |
| JP | 59229271 A | 12/1984 | |
| JP | 60-76267 A | 4/1985 | |
| JP | 60-164001 A | 8/1985 | |
| JP | 60151018 A | 8/1985 | |
| JP | 2-142664 A | 5/1990 | |
| JP | 9-52164 A | 2/1997 | |
| JP | 2003-14072 A | 1/2003 | |
| JP | 2004-74533 A | 3/2004 | |
| JP | 2008-105055 A | 5/2008 | |
| JP | 2011131225 A | 7/2011 | |
| WO | 2008/035805 A1 | 3/2008 | |

OTHER PUBLICATIONS

Communication dated May 27, 2015 from the European Patent Office in counterpart application No. 12841040.4.

* cited by examiner

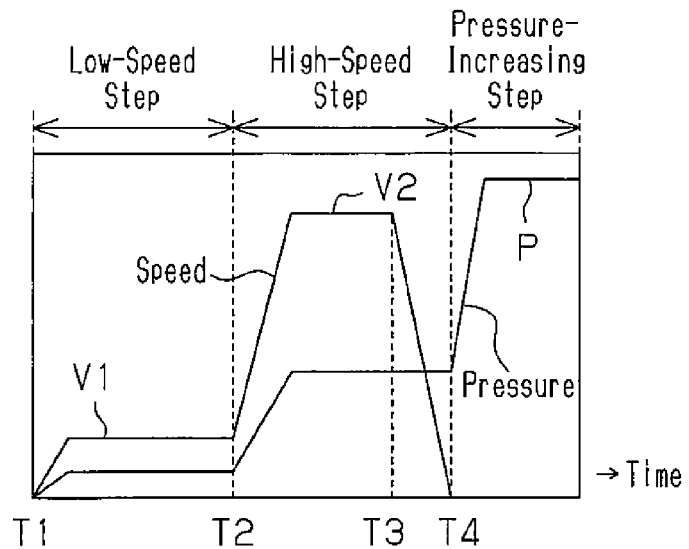
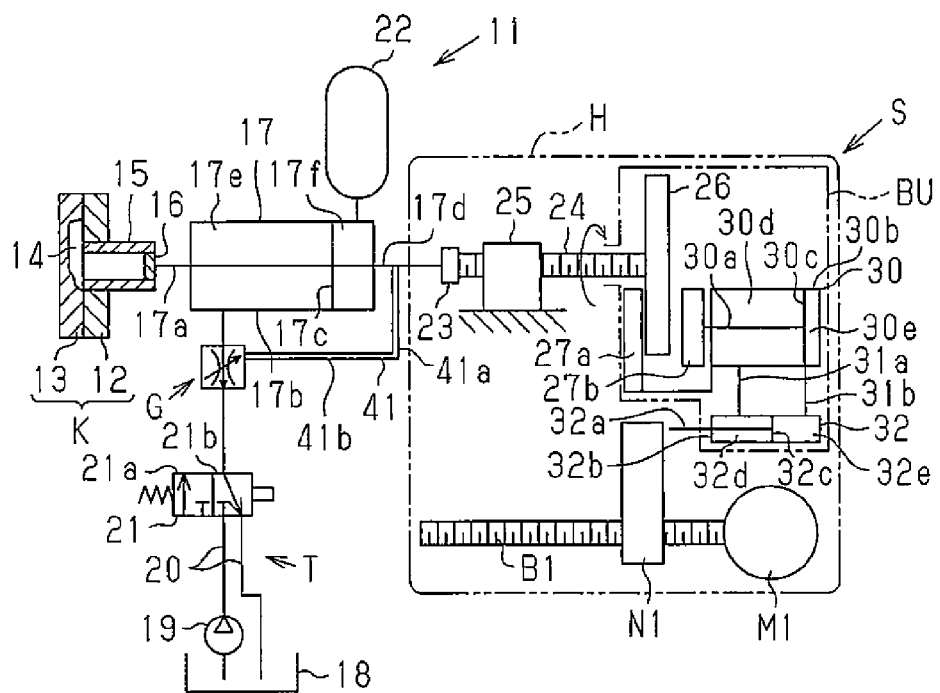

INJECTION APPARATUS

CROSS REFERENCE TO RELATED APPLICATIONS

This application is a National Stage of International Application No. PCT/JP2012/075522 filed Oct. 2, 2012, claiming priority based on Japanese Patent Application No. 2011-230017 filed Oct. 19, 2011, the contents of all of which are incorporated herein by reference in their entirety.

FIELD OF THE INVENTION

The present invention relates to an injection apparatus that injects molding material into a mold through an injection cylinder actuated by fluid pressure of incompressible fluid, thus filling the mold with the molding material.

BACKGROUND ART

Typically, an injection apparatus of a molding machine moves an injection plunger forward in a sleeve using an injection cylinder to press molding material (such as metal) out from the sleeve into a cavity formed between a pair of mold portions. The molding material is thus injected, or supplied, into the cavity. The injection, or supply, step includes a low-speed step, a high-speed step, and a pressure-increasing step.

The injection apparatus reduces the speed of the injection cylinder, which moves at a high speed in the high-speed step and then proceeds to the pressure-increasing step. At this stage, if the injection cylinder is decelerated insufficiently, the injection plunger, which is integral with the injection cylinder, strikes the mold with impact, applying excessive pressure, which is surge pressure, to the cavity. To avoid such an excessive pressure, the injection apparatus includes a speed reduction mechanism for reducing the speed of the injection cylinder. See Patent Document 1.

As shown in FIG. 8, in an injection apparatus disclosed in Patent Document 1, an injection plunger 82 is connected to a piston rod 80a of an injection cylinder 80 via a coupling 81. An L-shaped striker 83 is joined to the coupling 81. A magnetic scale 83a, which is formed by arranging magnetized portions and non-magnetized portions alternately at a constant interval, is attached to the striker 83. The injection cylinder 80 is connected to a non-illustrated hydraulic fluid tank via a fluid pressure circuit 80b. The fluid pressure circuit 80b includes a flow control valve 80c, which is driven by a pulse motor 80d.

The injection apparatus of Patent Document 1 also includes a magnetic sensor 84 for detecting a magnetic signal of the magnetic scale 83a and a position detector 85, which counts magnetic signals detected by the magnetic sensor 84 and converts the magnetic signals into a stroke signal of the injection plunger 82. The injection apparatus further includes a speed detector 86 for converting the stroke signal from the position detector 85 into a speed signal and an acceleration detector 87 for converting the speed signals from the speed detector 86 into an acceleration signal.

The injection apparatus also includes a determination circuit 88 for detecting a time point at which speed reduction is started based on the acceleration signal, a valve opening degree setting device 89 for setting the opening degree of the flow control valve 80c, a position setting device 90 for changing injection speed, and a control command generator 91 for controlling the flow control valve 80c.

In the injection apparatus of Patent Document 1, the striker 83 operates in conjunction with the injection plunger 82 when the injection plunger 82 moves. The magnetic sensor 84 detects a magnetic signal of the magnetic scale 83a, which is integral with the striker 83. Then, based on signals from the position detector 85, the speed detector 86, the acceleration detector 87, the determination circuit 88, the valve opening degree setting device 89, and the position setting device 90, the control command generator 91 outputs a control command to the pulse motor 80d. The opening degree of the flow control valve 80c is thus controlled to adjust the amount of the hydraulic fluid delivered from the fluid pressure circuit 80b into the injection cylinder 80. In this manner, the movement speed of the injection cylinder 80 is controlled to allow the aforementioned speed reduction to occur.

PRIOR ART DOCUMENTS

Patent Documents

Patent Document 1: Japanese Laid-Open Patent Publication No. 60-76267

SUMMARY OF THE INVENTION

However, in the injection apparatus of Patent Document 1, when the magnetic sensor 84 detects movement of the striker 83 and the time elapsing since such detection reaches the time point at which the speed of the injection cylinder 80 should be reduced, speed reduction of the injection cylinder 80 is started only after the devices 85 to 90 input or output signals and then the opening degree of the flow control valve 80c is controlled. The injection apparatus of Patent Document 1 thus has a poor responsiveness after the time point for reducing the speed of the injection cylinder 80.

Accordingly, it is an objective of the present invention to provide an injection apparatus capable of improving responsiveness after a time point at which the speed of an injection cylinder should be reduced.

To achieve the foregoing objective and in accordance with one aspect of the present invention, an injection apparatus is provided that injects molding material into a mold through an injection cylinder operated by fluid pressure of an incompressible fluid to fill the mold with the molding material. The apparatus includes a pressure accumulating portion, which is connected to an operation chamber in the injection cylinder to accumulate the fluid pressure, a speed reduction mechanism for reducing the speed of the injection cylinder, and a passage for selectively supplying and draining the incompressible fluid to and from the injection cylinder. The injection cylinder includes a movable rod. The speed reduction mechanism includes an actuating member moving integrally with the rod of the injection cylinder, a restriction member mounted in the passage, and a receiving member for movably receiving the restriction member. The restriction member is movable in conjunction with movement of the actuating member and variably restricts the passage. The receiving member includes a supply port connected to the passage and a drain port communicating with the supply port. The restriction member has a restriction formed to restrict the passage to decrease the flow rate of the incompressible fluid from the supply port to the drain port.

In this configuration, in an injection step, the actuating member moves integrally with the rod of the injection cylinder. At a time point for reducing the speed of the injection cylinder, the restriction member starts to move in the receiving member in conjunction with movement of the actuating member. As a result, the restriction of the restriction member restricts the passage of the incompressible fluid from the supply port to the drain port. When a supply passage for the incompressible fluid is restricted, the hydraulic pressure applied to the injection cylinder is reduced. If a drain passage for the incompressible fluid is restricted, the draining speed of the incompressible fluid is decreased. This reduces the speed of the injection cylinder. That is, by operating the restriction member in conjunction with the injection cylinder, the restriction member is operated synchronously with the injection cylinder such that restriction of the passage, or, in other words, speed reduction of the injection cylinder, is mechanically accomplished. This improves the responsiveness after the speed reducing time point compared with a case in which speed reduction of the injection cylinder is started after signal input or output by sensors and devices is completed and then valve opening control is carried out.

BRIEF DESCRIPTION OF THE DRAWINGS

FIG. 3 is a graph representing changes of injection pressure and changes of injection speed in the injection apparatus;

FIG. 4 is a diagram schematically illustrating a state in which an injection cylinder and a pilot cylinder operate;

DETAILED DESCRIPTION OF THE PREFERRED EMBODIMENTS

First Embodiment

An injection apparatus according to a first embodiment of the present invention will now be described with reference to FIGS. 1 to 6. In the description below, the left side and the right side of each drawing are defined as the first side and the second side, respectively. Similarly, the left end and the right end of each component are defined as the first end and the second end, respectively.

Figure 1:
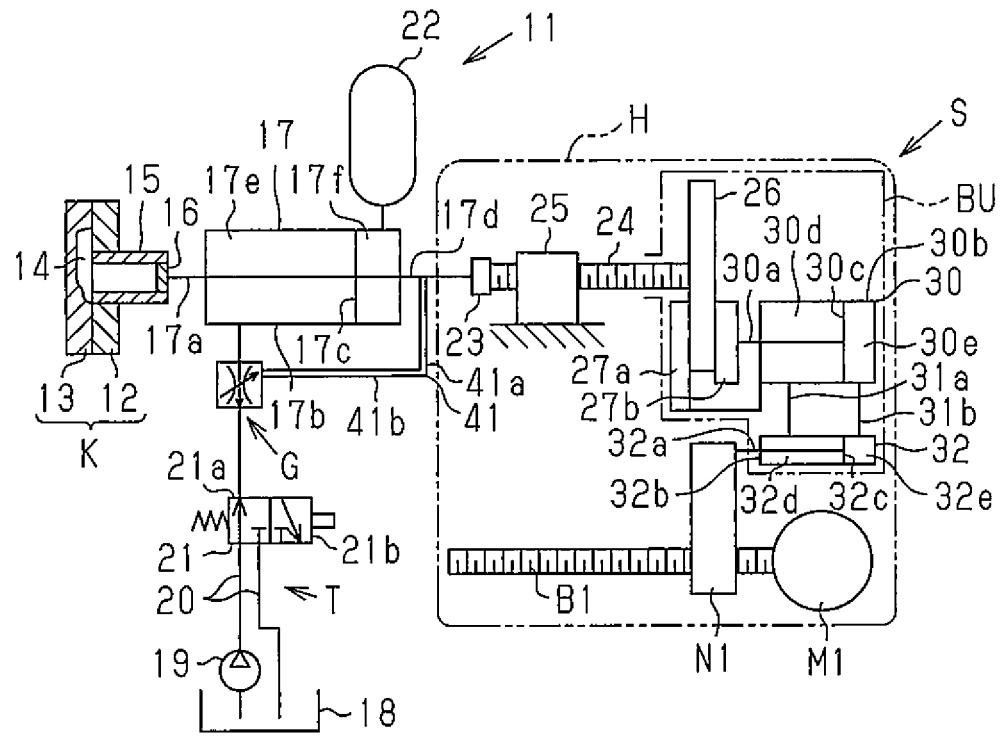
FIG. 1 is a diagram schematically showing an injection apparatus according to a first embodiment of the present invention.

As shown in FIG. 1, a mold K includes a fixed mold portion 12 and a movable mold portion 13. The fixed mold portion 12 and the movable mold portion 13 are joined together, separated from each other, or clamped by a non-illustrated mold clamping device. An injection apparatus 11 injects, or supplies, metal material serving as molding material into a cavity 14, which is formed in the mold K. After having been injected into and solidified in the mold K, the metal material is removed from the mold K as a desired molded product.

The fixed mold portion 12 has an injection sleeve 15 communicating with the cavity 14. An injection plunger 16 is slidably mounted in the injection sleeve 15. The injection plunger 16 is connected to a first rod 17a, which is one of the rods of a double-rod type injection cylinder 17. A piston 17c, which is integral with the first rod 17a, is movably received in a cylinder tube 17b of the injection cylinder 17. A second rod 17d is formed integrally with the piston 17c at the side of the piston 17c opposite to the first rod 17a. The piston 17c divides the interior of the cylinder tube 17b into a first chamber 17e serving as an operation chamber located at the side corresponding to the first rod 17a and a second chamber 17f serving as an operation chamber arranged at the opposite side, which is the side corresponding to the second rod 17d.

Figure 2:
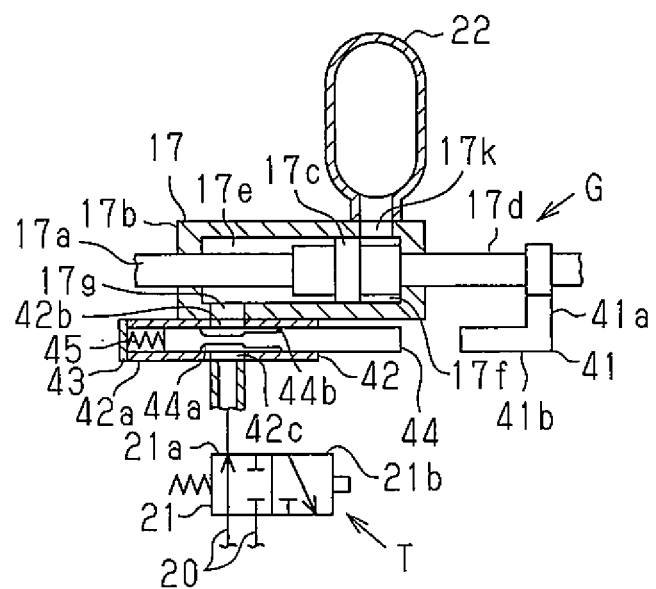
FIG. 2 is a diagram schematically showing a speed reduction mechanism of the injection apparatus illustrated in FIG. 1.

With reference to FIG. 2, the cylinder tube 17b of the injection cylinder 17 has a supply port 17k communicating with the second chamber 17f. An accumulator 22 serving as a pressure accumulating portion is connected to the supply port 17k. The accumulator 22 stores hydraulic fluid serving as incompressible fluid. The hydraulic fluid is supplied from the accumulator 22 into the second chamber 17f through the supply port 17k. Hydraulic pressure, which is fluid pressure, is thus applied to the piston 17c in the direction toward the mold K, allowing the first rod 17a and the second rod 17d to move toward the mold K. The cylinder tube 17b has a drain port 17g, which communicates with the first chamber 17e.

As shown in FIG. 1, a control unit S is mechanically joined to the second rod 17d of the injection cylinder 17. Specifically, the first end of a rotary shaft 24, which is configured by a ball screw, is connected to the distal end of the second rod 17d through a joint 23. The joint 23 supports the rotary shaft 24 to the second rod 17d in a manner allowing the rotary shaft 24 to rotate relative to the second rod 17d. A nut 25 is threaded onto the rotary shaft 24. The nut 25 is fixed to a housing (not shown) of the injection apparatus 11 immovably and non-rotationally. As a result, when the second rod 17d proceeds or retreats, the rotary shaft 24 axially proceeds or retreats and rotates relative to the nut 25.

A brake disk 26 serving as a rotation member is connected to the rotary shaft 24 at the second end of the rotary shaft 24 in a manner rotational integrally with the rotary shaft 24. A first brake pad 27a and a second brake pad 27b are arranged opposed to each other at the front side and the rear side, respectively, in the direction of the thickness of the brake disk 26. The first brake pad 27a and the second brake pad 27b are movable in conjunction with each other toward or away from the brake disk 26. When the first and second brake pads 27a, 27b are pressed against the brake disk 26, the first and second brake pads 27a, 27b slide on the rotating brake disk 26 and generate friction resistance to the brake disk 26.

The distal end of an actuating rod 30a of an actuating cylinder 30 is joined to the second brake pad 27b. A cylinder tube 30b of the actuating cylinder 30 receives a piston 30c, which is integral with the actuating rod 30a. The piston 30c divides the interior of the cylinder tube 30b into a first rod chamber 30d located at the side corresponding to the actuating rod 30a and a first head chamber 30e arranged at the opposite side to the actuating rod 30a.

A pilot cylinder 32 is connected to the actuating cylinder 30 through a first fluid supply-and-drain passage 31a and a second fluid supply-and-drain passage 31b. A piston 32c is accommodated in a cylinder tube 32b of the pilot cylinder 32. A pilot rod 32a is formed integrally with the piston 32c. The piston 32c divides the interior of the cylinder tube 32b into a second rod chamber 32d at the side corresponding to the pilot rod 32a and a second head chamber 32e at the opposite side to the pilot rod 32a.

The first rod chamber 30d of the actuating cylinder 30 is connected to the second rod chamber 32d of the pilot cylinder 32 through the first fluid supply-and-drain passage 31a. The first head chamber 30e of the actuating cylinder 30 is connected to the second head chamber 32e of the pilot cylinder 32 through the second fluid supply-and-drain passage 31b.

Hydraulic fluid serving as incompressible fluid is retained in the first rod chamber 30d and the second rod chamber 32d and in the first head chamber 30e and the second head chamber 32e. The first and second fluid supply-and-drain passages 31a, 31b form a closed circuit.

The diameter of the actuating cylinder 30 is greater than the diameter of the pilot cylinder 32. An amplification circuit for amplifying the thrust force of the actuating rod 30a in the actuating cylinder 30 is configured by the difference in diameter between the actuating cylinder 30 and the pilot cylinder 32 and using the first and second fluid supply-and-drain passages 31a, 31b.

The distal end of the pilot rod 32a is selectively brought into contact with and separated from a drive nut N1. The drive nut N1 is threaded onto a drive ball screw B1. The drive ball screw B1 is driven by a drive motor M1 to rotate in forward and reverse directions. When the drive motor M1 rotates, the drive ball screw B1 rotates at the same speed as the rotation speed of the drive motor M1. The drive nut N1, which is threaded onto the drive ball screw B1, moves at the speed corresponding to the rotation speed of the drive ball screw B1.

When the drive ball screw B1 rotates in a certain direction, the drive nut N1 proceeds (linearly moves) in the axial direction of the drive ball screw B1 and the pilot rod 32a proceeds in conjunction with the drive nut N1. This drains the hydraulic fluid from the second rod chamber 32d to the first rod chamber 30d through the first fluid supply-and-drain passage 31a and from the first head chamber 30e into the second head chamber 32e via the second fluid supply-and-drain passage 31b. As a result, the second brake pad 27b, which is integral with the actuating rod 30a, is separated from the brake disk 26.

In the first embodiment, the brake disk 26, the first brake pad 27a, the second brake pad 27b, the actuating cylinder 30, the first and second fluid supply-and-drain passages 31a, 31b, and the pilot cylinder 32 are accommodated in a housing H to form a unit. In the housing H, the rotary shaft 24, the brake disk 26, the actuating cylinder 30, the first brake pad 27a, the second brake pad 27b, and the pilot cylinder 32 are accommodated as an integral body, which is a brake unit BU. The brake unit BU is received in the housing H to be movable in the forward-rearward direction.

Actuation patterns (injection patterns) of the injection apparatus 11 will hereafter be described with reference to FIG. 3.

The injection apparatus 11 operates according to a low-speed step, a high-speed step, and a pressure-increasing step. The low-speed step is a step at an initial stage of injection. In the low-speed step, the injection plunger 16 is actuated to inject metal material from the injection sleeve 15 into the cavity 14.

The high-speed step is performed after the low-speed step. In the high-speed step, the injection plunger 16 of the injection sleeve 15 is actuated at a high speed compared with the low-speed step. At a later stage of the high-speed step, the injection plunger 16 is gradually decelerated. When the speed of the injection plunger 16 approximates zero, the injection apparatus 11 starts the pressure-increasing step. The pressure-increasing step is a step at a final stage of injection and carried out after the high-speed step. In the pressure-increasing step, the metal material in the cavity 14 is pressurized using the force generated by the injection plunger 16 of the injection sleeve 15 in the direction proceeding toward the mold K.

Referring to FIG. 3, the injection apparatus 11 is required to operate in different actuation patterns in the steps. In other words, in the substantially entire period of the high-speed step, the injection plunger 16 must operate at a high speed compared with the low-speed step. In contrast, the injection plunger 16 does not have to operate rapidly in the pressure-increasing step. In the pressure-increasing step, the injection plunger 16 must operate to produce high pressure compared with the low-speed step and high-speed step. In contrast, the injection plunger 16 does not have to operate to produce high pressure in the low-speed and high-speed steps, compared with the pressure-increasing step.

A speed reduction mechanism G of the first embodiment will hereafter be described.

As illustrated in FIG. 2, an L-shaped actuating member 41 is joined to the second rod 17d of the injection cylinder 17 in a manner rotational integrally with the second rod 17d. Specifically, a joint portion 41a, which extends perpendicular to the axial direction of the second rod 17d, connects the actuating member 41 to the second rod 17d. The actuating member 41 has an arm 41b, which projects perpendicular to the joint portion 41a and extends in the axial direction of the second rod 17d.

A receiving member 42 is attached to the outer surface (the lower surface as viewed in FIG. 1) of the injection cylinder 17. The receiving member 42 includes a cylinder tube 42a, which has a supply port 42b. The supply port 42b communicates with the drain port 17g of the injection cylinder 17. The hydraulic fluid drained from the first chamber 17e of the injection cylinder 17 flows into the receiving member 42 via the drain port 17g and the supply port 42b. The cylinder tube 42a also includes a drain port 42c, which is formed at the position facing the supply port 42b. The hydraulic fluid introduced from the injection cylinder 17 into the receiving member 42 is drained from the receiving member 42 via the drain port 42c. That is, the receiving member 42 is arranged in the drainage path of the hydraulic fluid with respect to the injection cylinder 17.

In the receiving member 42, a lid member 43 is joined to and closes the first end of the cylinder tube 42a. The second end of the cylinder tube 42a is open. The cylinder tube 42a receives a columnar movable restriction member 44, which variably restricts the passage. A returning member 45 formed by a coil spring is mounted between the first end of the restriction member 44 and the lid member 43. The returning member 45 urges the restriction member 44 toward the second side of the cylinder tube 42a. When the restriction member 44 is pressed toward the mold K against the returning member 45, the returning member 45 is compressed to move the restriction member 44 toward the mold K by the amount corresponding to the compressed amount of the returning member 45. In contrast, by releasing the restriction member 44, the returning member 45 is returned from the compressed state to its original state, thus generating force to move the restriction member 44 away from the mold K.

A second-side portion of the restriction member 44 protrudes from the second end of the cylinder tube 42a. A passage forming recess 44a, through which hydraulic fluid flows from the supply port 42b to the drain port 42c, is formed in a peripheral surface of the restriction member 44 by recessing a portion of the restriction member 44 along the axis. When the passage forming recess 44a is arranged between the supply port 42b and the drain port 42c, the hydraulic fluid introduced into the receiving member 42 through the supply port 42b flows in the passage forming recess 44a and is thus drained from the receiving member 42 through the drain port 42c. The cross-sectional area of the passage forming recess 44a in the axial direction of the restriction member 44 is equal to both the cross-sectional area of the supply port 42b and the cross-sectional area of the drain port 42c. This allows the hydraulic fluid to flow from the supply port 42b to the drain port 42c through the passage forming recess 44a without being restricted by the passage forming recess 44a.

A restriction forming recess 44b serving as a restriction is formed in the peripheral surface of the restriction member 44 at a position close to the second end along the axis compared with the position of the passage forming recess 44a. The depth of the restriction forming recess 44b is smaller than the depth of the passage forming recess 44a. When the restriction forming recess 44b is located between the supply port 42b and the drain port 42c, the hydraulic fluid introduced into the receiving member 42 via the supply port 42b flows in the restriction forming recess 44b and is thus drained from the receiving member 42 through the drain port 42c.

The cross-sectional area (the cross-sectional area for the hydraulic fluid) of the restriction forming recess 44b in the axial direction of the restriction member 44 is smaller than both the cross-sectional area of the supply port 42b and the cross-sectional area of the drain port 42c and smaller than the cross-sectional area of the passage forming recess 44a. The restriction forming recess 44b thus restricts the hydraulic fluid when the hydraulic fluid flows from the supply port 42b to the drain port 42c through the passage forming recess 44a.

The restriction member 44 is arranged such that the passage forming recess 44a faces the supply port 42b and the drain port 42c when the restriction member 44 is urged toward the second side of the cylinder tube 42a by the returning member 45 without being pressed toward the mold K. The restriction forming recess 44b is close to the second side of the cylinder tube 42a compared with the supply port 42b and the drain port 42c.

In the high-speed step, the distal end of the arm 41b of the actuating member 41 contacts the second end of the restriction member 44 at the time point for starting speed reduction (at time point T3 in FIG. 3). When the piston 17c and the second rod 17d are moved by the hydraulic pressure applied by the accumulator 22, the actuating member 41 is moved in conjunction with the second rod 17d. Such movement of the actuating member 41 presses the restriction member 44 toward the returning member 45, thus moving the restriction member 44 toward the first side of the cylinder tube 42a (toward the mold K). In other words, the length of the arm 41b of the actuating member 41, the urging force of the returning member 45, and the length of the restriction member 44 are adjusted such that the arm 41b of the actuating member 41 comes into contact with the restriction member 44 at the time point for starting speed reduction (at time point T3). That is, the restriction member 44 is allowed to move in conjunction with the actuating member 41 after having been brought into contact with the actuating member 41.

With reference to FIG. 2, a supply-and-drain mechanism T is connected to the drain port 42c of the cylinder tube 42a. The supply-and-drain mechanism T supplies hydraulic fluid to the first chamber 17e and drains the hydraulic fluid from the first chamber 17e through the receiving member 42. The supply-and-drain mechanism T is configured by a hydraulic fluid tank 18, a pump 19 for pumping hydraulic fluid out from the hydraulic fluid tank 18, and an electromagnetic switch valve 21, which is mounted in a hydraulic fluid passage 20 connecting the first chamber 17e to the pump 19. The electromagnetic switch valve 21 is switchable between a first position 21a and a second position 21b. When arranged at the first position 21a, the electromagnetic switch valve 21 permits the hydraulic fluid pumped out of the hydraulic fluid tank 18 by the pump 19 to be supplied to the first chamber 17e. When arranged at the second position 21b, the electromagnetic switch valve 21 permits the hydraulic fluid to be drained from the first chamber 17e into the hydraulic fluid tank 18.

Operation of the injection apparatus 11 of the first embodiment will now be described.

The low-speed step will first be described.

As shown in FIG. 1, before the low-speed step is started, the injection plunger 16 of the injection sleeve 15, the first rod 17a and the second rod 17d of the injection cylinder 17, the actuating rod 30a of the actuating cylinder 30, and the pilot rod 32a of the pilot cylinder 32 are arranged at predetermined initial positions, which are illustrated in the drawing. The rods 17a, 17d, 30a, 32a located at the initial positions do not apply injection pressure to the metal material supplied into the injection sleeve 15 (at time point T1 in FIG. 3).

At this stage, the electromagnetic switch valve 21 is arranged at the first position 21a to stop the hydraulic fluid in the first chamber 17e of the injection cylinder 17 from returning to the hydraulic fluid tank 18. The second chamber 17f receives the hydraulic fluid from the accumulator 22. The piston 17c receives, as hydraulic pressure, energy necessary for generating thrust force for the injection plunger 16.

When located at the initial positions, the drive motor M1 is not operated and the drive nut N1 is stopped. The pilot rod 32a of the pilot cylinder 32 is pressed against the drive nut N1. The hydraulic pressure applied by the pilot cylinder 32 is amplified by the amplification circuit and then applied to the piston 30c of the actuating cylinder 30. The amplified hydraulic pressure presses the second brake pad 27b, which is integral with the actuating rod 30a, against the brake disk 26 and presses the first brake pad 27a against the brake disk 26 in conjunction with the second brake pad 27b. The brake unit BU thus restricts rotation of the brake disk 26 and rotation of the rotary shaft 24, which is integral with the brake disk 26.

As a result, movement of the second rod 17d, which is integral with the rotary shaft 24, is restricted. Movement of the piston 17c of the injection cylinder 17, which is in a state movable by the hydraulic pressure from the accumulator 22, is restricted by the second rod 17d. That is, the piston 17c is prohibited from moving. Specifically, since the hydraulic pressure from the accumulator 22 acts on the piston 17c, the piston 17c is held in a standby state where the piston 17c can move immediately when permitted.

Referring to FIG. 2, in the speed reduction mechanism G, the restriction member 44 is urged toward the second end of the cylinder tube 42a by the returning member 45 without being pressed toward the mold K. The restriction member 44 is thus arranged in the speed reduction mechanism G such that the passage forming recess 44a faces the supply port 42b and the drain port 42c.

After preparation including clamping of the fixed mold portion 12 and the movable mold portion 13 and metal material supply to the injection sleeve 15 is completed, the injection apparatus 11 initiates the low-speed step. In the low-speed step, the first rod 17a of the injection cylinder 17 (the injection plunger 16) moves at an injection speed V1, as represented in FIG. 3. At the same time, the electromagnetic switch valve 21 is switched to the second position 21b.

As illustrated in FIG. 4, when the drive motor M1 is activated, the drive ball screw B1 rotates to cause the drive nut N1 to proceed. This temporarily separates the pilot rod 32a of the pilot cylinder 32, which has been pressed against the drive nut N1, from the drive nut N1. The pilot rod 32a then proceeds together with the drive nut N1.

As the pilot rod 32a proceeds, the hydraulic fluid in the second rod chamber 32d is drained to the first rod chamber 30d through the first fluid supply-and-drain passage 31a, and the hydraulic fluid in the first head chamber 30e is introduced into the second head chamber 32e through the second fluid supply-and-drain passage 31b. The actuating rod 30a is thus retracted into the cylinder tube 30b, thus separating the second brake pad 27b, which is integral with the actuating rod 30a, from the brake disk 26. The first brake pad 27a is also separated from the brake disk 26, in conjunction with the second brake pad 27b. At this stage, the first rod 17a and the second rod 17d slowly proceed and the brake disk 26 and the rotary shaft 24 slowly rotate.

Figure 5:
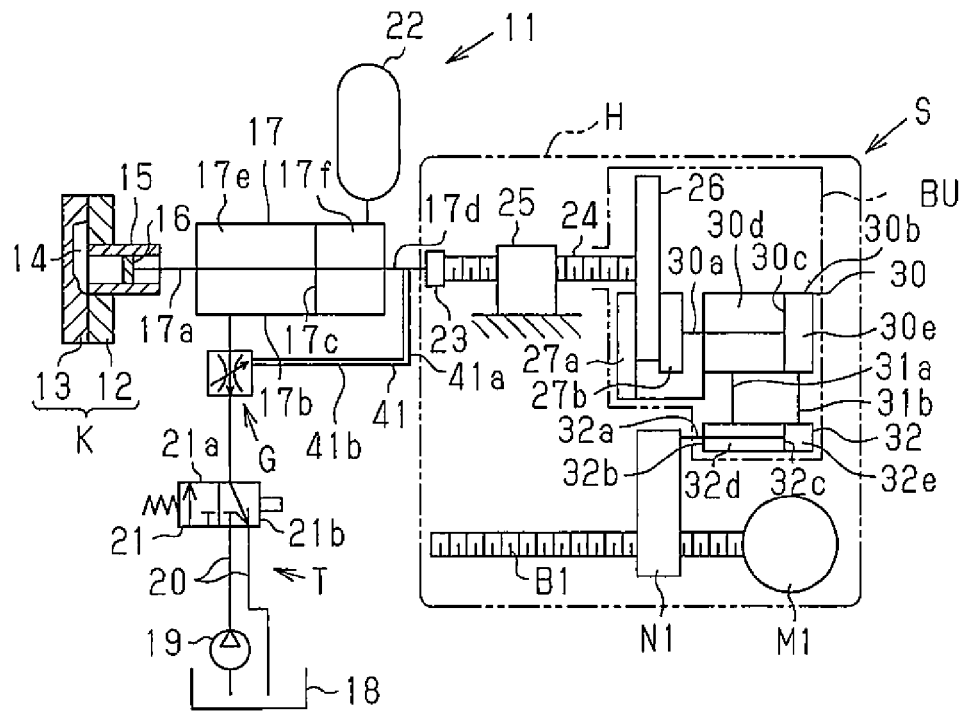
FIG. 5 is a diagram schematically showing a state in which the injection cylinder operates.

As a result, with reference to FIG. 5, the piston 17c, movement of which has been restricted by the brake unit BU, receives the hydraulic pressure from the accumulator 22 and thus proceeds toward the first chamber 17e at the aforementioned injection speed V1. This causes the first rod 17a, which is integral with the piston 17c, to proceed at the injection speed V1. As a result, the injection plunger 16, which is joined to the first rod 17a, to proceed toward the cavity 14 at the injection speed V1. This injects the metal material from the injection sleeve 15 into the cavity 14.

Simultaneously, the hydraulic fluid in the first chamber 17e is drained from the injection cylinder 17 via the drain port 17g and introduced into the receiving member 42 through the supply port 42b. At this stage, the restriction member 44 is not pressed by the actuating member 41. The hydraulic fluid thus flows in the passage forming recess 44a of the restriction member 44 and is thus drained from the receiving member 42 through the drain port 42c without being restricted by the passage forming recess 44a. Afterwards, the hydraulic fluid is drained to the hydraulic fluid tank 18 through the electromagnetic switch valve 21, which is held at the second position 21b.

Also, the brake unit BU, which is connected to the injection plunger 16 via the first rod 17a, the second rod 17d, and the rotary shaft 24, proceeds to cause the injection plunger 16 to proceed. When the injection plunger 16 reaches the final position of the low-speed step (at time point T2 in FIG. 3), the injection apparatus 11 ends the low-speed step and starts the high-speed step. In the high-speed step, the injection plunger 16 moves at an injection speed V2, as represented in FIG. 3.

The injection apparatus 11 then operates in the above-described manner to carry out the high-speed step. In the high-speed step, the first rod 17a and the second rod 17d proceed at a high speed and the brake disk 26 and the rotary shaft 24 rotate at a high speed. At the time point for reducing the speed of the injection plunger 16 in the high-speed step (at time point T3 in FIG. 3), the speed reduction mechanism G is activated.

Figure 6:
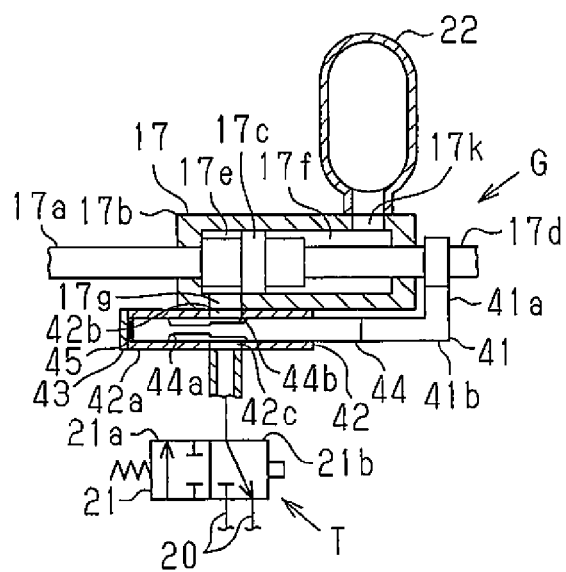
FIG. 6 is a diagram schematically showing a state in which the speed reduction mechanism operates.

As illustrated in FIG. 6, when the second rod 17d proceeds, the actuating member 41, which is integral with the second rod 17d, also proceeds, or moves, to cause the arm 41b of the actuating member 41 to contact the second end of the restriction member 44. As the second rod 17d continuously proceeds, or moves, the actuating member 41 is caused to press the restriction member 44. This moves the restriction member 44 in conjunction with movement of the actuating member 41 toward the mold K against the urging force of the returning member 45. As a result, the restriction forming recess 44b is moved to the position facing the supply port 42b and the drain port 42c in the restriction member 44, at which the passage forming recess 44a has been located.

In this state, the hydraulic fluid drained from the first chamber 17e is thus delivered from the supply port 42b of the receiving member 42 into the restriction forming recess 44b in the receiving member 42. This restricts the amount of the hydraulic fluid drained from the first chamber 17e, or, in other words, decreases the flow rate of the hydraulic fluid. As a result, the amount of the hydraulic fluid drained from the receiving member 42 through the drain port 42c of the receiving member 42 is reduced, and the speed of the piston 17c is reduced. The speed of the first rod 17a, which is integral with the piston 17c, is thus also reduced such that the speed of the injection plunger 16 is reduced. After having been drained from the receiving member 42, the hydraulic fluid is drained to the hydraulic fluid tank 18 through the electromagnetic switch valve 21, which is maintained at the second position 21b.

Then, when the injection plunger 16 reaches a position at which the injection plunger 16 should proceed in the high-speed step (at time point T4 in FIG. 3), the injection apparatus 11 ends the high-speed step and carries out the pressure-increasing step.

In the pressure-increasing step, pressure applied by the injection plunger 16 reaches an injection pressure P, as represented in FIG. 3. Then, the injection apparatus 11 operates in the above-described manner and starts the pressure-increasing step. In the pressure-increasing step, the pilot rod 32a does not contact the drive nut N1. The hydraulic pressure from the accumulator 22 is thus applied to the injection plunger 16 via the first rod 17a.

Afterwards, when the metal material in the cavity 14 is solidified, the first rod 17a of the injection cylinder 17 is caused to recede. At this stage, the electromagnetic switch valve 21 is switched to the first position 21a. This drives the pump 19 to supply the hydraulic fluid pumped by the pump 19 to the first chamber 17e of the injection cylinder 17. The first rod 17a of the injection cylinder 17 thus recedes and the injection plunger 16 also recedes. This returns the hydraulic fluid from the second chamber 17f into the accumulator 22. The second rod 17d also recedes to cause the urging force of the returning member 45 to return the restriction member 44 to the original position where the restriction member 44 was located before being pressed by the actuating member 41. In other words, the restriction member 44 is returned to such a position that the passage forming recess 44a of the restriction member 44 faces the supply port 42b and the drain port 42c. Afterwards, the fixed mold portion 12 and the movable mold portion 13 are separated from each other, and the molded product is removed from the mold K.

The first embodiment has the advantages described below.

(1) In the injection apparatus 11, the actuating member 41 is connected to the second rod 17d of the injection cylinder 17 in a manner movable integrally with the second rod 17d. The receiving member 42 is mounted in the drain passage of hydraulic fluid from the injection cylinder 17. The hydraulic fluid drained from the injection cylinder 17 flows in the receiving member 42. The restriction member 44 is arranged in the receiving member 42 to restrict the passage of the hydraulic fluid. The restriction member 44 is moved in conjunction with the actuating member 41, which moves integrally with the injection cylinder 17, such that the amount of the hydraulic fluid drained from the injection cylinder 17 is reduced by the restriction forming recess 44b of the restriction member 44. In other words, by moving the restriction member 44 in conjunction with the injection cylinder 17, the restriction member 44 is operated synchronously with the injection cylinder 17 and the passage is restricted mechanically. The restriction member 44 is thus mechanically operated at the time point for reducing the speed of the injection cylinder 17 (at time point T3) to decelerate the injection cylinder 17. This improves response after the speed reduction time point compared with a case in which speed reduction of the injection cylinder 17 is started only after signal input or output by sensors and devices is accomplished and valve opening control is achieved. Additionally, the aforementioned time point is adjusted accurately and reliably.

(2) By moving the restriction member 44 in conjunction with the actuating member 41, which moves integrally with the injection cylinder 17, the movement speed of the injection cylinder 17 is mechanically decreased in a manner synchronous with movement of the injection cylinder 17. This makes it unnecessary to employ a flow control valve, a motor for driving the flow control valve, and various signal input or output devices to decelerate the injection cylinder 17. The configuration of the injection apparatus 11 is thus simplified.

(3) In the high-speed step, the restriction member 44 starts to move at the time point for speed reduction (at time point T3) to move the restriction forming recess 44b to the position facing the supply port 42b, at which the passage forming recess 44a has been located. This rapidly decreases the cross-sectional area of the hydraulic fluid passage, thus quickly decreasing the movement speed of the injection cylinder 17.

(4) The receiving member 42 is joined to the injection cylinder 17. The supply port 42b of the receiving member 42 is connected to the drain port 17g of the injection cylinder 17. The restriction member 44 is movably received in the receiving member 42. This arrangement forms a passage of hydraulic fluid in the receiving member 42. The passage is restricted by the restriction forming recess 44b of the restriction member 44, which operates in conjunction with the actuating member 41. This ensures a simple configuration for restricting the hydraulic fluid passage from the injection cylinder 17 to decelerate the injection cylinder 17.

(5) The returning member 45 is mounted in the receiving member 42 to return the restriction member 44 to the state before the restriction member 44 is pressed by the actuating member 41. This simplifies operation of the injection apparatus 11 compared with a case in which the restriction member 44 is manually returned after the injection cylinder 17 is caused to recede.

Second Embodiment

A second embodiment of the present invention will now be described with reference to FIG. 7. The same components in the second embodiment as those in the first embodiment are given the same reference numerals and description thereof is omitted.

Figure 7A:
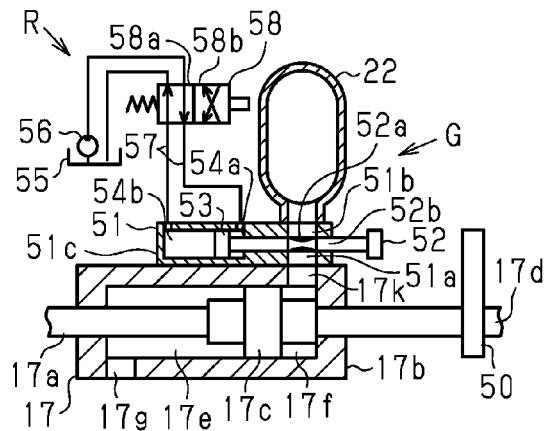
FIGS. 7(a), 7(b), and 7(c) are diagrams schematically showing a speed reduction mechanism of an injection apparatus according to a second embodiment of the invention.
Figure 7B:
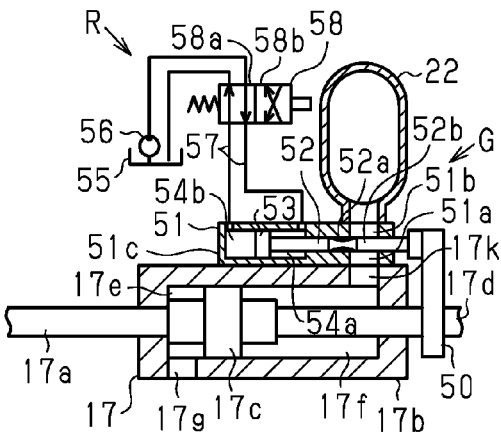
Figure 7C:
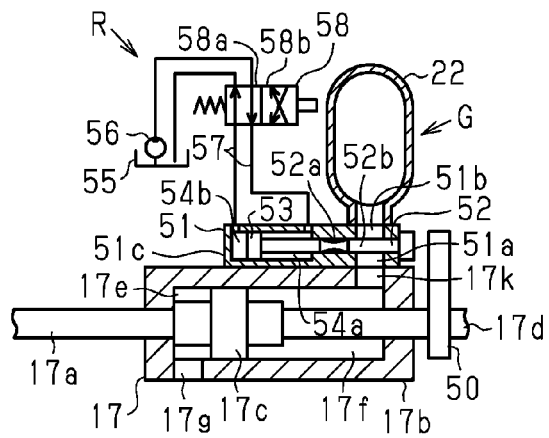
Figure 8:
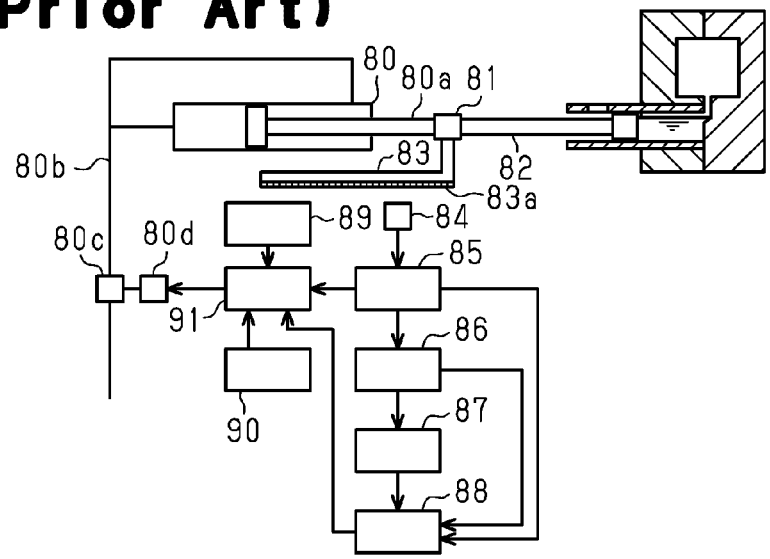
FIG. 8 is a diagram schematically showing an injection apparatus of the background art.

As illustrated in FIGS. 7(a) to 7(c), in the speed reduction mechanism G, a receiving member 51 is attached to the outer surface (the upper surface) of the injection cylinder 17 such that a drain port 51a of the receiving member 51 communicates with the supply port 17k of the injection cylinder 17. The accumulator 22 is connected to the supply port 51b of the receiving member 51. In other words, the receiving member 51 is mounted in a passage for supplying hydraulic fluid to the injection cylinder 17. A restriction member 52 is accommodated in a cylinder tube 51c of the receiving member 51 and has a restriction 52a. The restriction 52a is formed by cutting the peripheral surface of the restriction member 52 in an arcuate shape. That is, the depth of the restriction 52a becomes gradually greater from the first axial end toward the second axial end of the restriction member 52 before becoming gradually smaller. The portion of the restriction member 52 close to the second axial end with respect to the restriction 52a is a block portion 52b for blocking the hydraulic fluid flowing from the supply port 51b.

In the receiving member 51, a piston 53 is joined to the first end of the restriction member 52 in a manner movable integrally with the restriction member 52. The piston 53 is movably received in the receiving member 51. The piston 53 divides the interior of a the receiving member 51 into a first operation chamber 54a at the side corresponding to the restriction member 52 and a second operation chamber 54b, which is located at the opposite side to the first operation chamber 54a. A supply-and-drain mechanism R for selectively supplying and draining hydraulic fluid is connected to the first operation chamber 54a and the second operation chamber 54b. The supply-and-drain mechanism R is configured by a hydraulic fluid tank 55, a pump 56 for pumping the hydraulic fluid out from the hydraulic fluid tank 55, and an electromagnetic switch valve 58 mounted in a hydraulic fluid passage 57 for connecting the first operation chamber 54a or the second operation chamber 54b to the pump 56.

The electromagnetic switch valve 58 can be arranged at a first position 58a, at which the electromagnetic switch valve 58 permits supply of the hydraulic fluid pumped out of the hydraulic fluid tank 55 by the pump 56 to the first operation chamber 54a and drainage of the hydraulic fluid from the second operation chamber 54b to the hydraulic fluid tank 55. The electromagnetic switch valve 58 can also be arranged at a second position 58b, at which the electromagnetic switch valve 58 permits supply of the hydraulic fluid pumped out of the hydraulic fluid tank 55 by the pump 56 to the second operation chamber 54b and drainage of the hydraulic fluid from the first operation chamber 54a to the hydraulic fluid tank 55.

The second-side portion of the restriction member 52 protrudes from the receiving member 51. An actuating member 50, which is joined to the second rod 17d, extends perpendicular to the second rod 17d. When the second rod 17d moves, the actuating member 50 presses the second end of the restriction member 52 to move the restriction member 52 into the receiving member 51.

As illustrated in FIG. 7(a), when the injection apparatus 11 is arranged at the initial position, the restriction member 52 is not pressed by the actuating member 50 and the restriction 52a as a whole is arranged to face the drain port 51a and the supply port 51b. The electromagnetic switch valve 58 of the supply-and-drain mechanism R is located at the first position 58a. At the time point for speed reduction in the high-speed step, referring to FIG. 7(b), the actuating member 50 is caused to press the restriction member 52. In this state, hydraulic fluid is delivered from the hydraulic fluid tank 55 of the supply-and-drain mechanism R into the first operation chamber 54a and hydraulic pressure is applied to the piston 53 of the restriction member 52. The hydraulic pressure thus assists movement of the restriction member 52.

As the restriction 52a continuously moves, the depth of the restriction 52a with respect to the supply port 51b becomes gradually smaller and a part of the block portion 52b is moved to a position facing the supply port 51b. The restriction 52a thus reduces the amount of the hydraulic fluid supplied from the accumulator 22 to the second chamber 17f. In other words, the flow rate of the hydraulic fluid is decreased. This decreases the hydraulic pressure applied to the piston 17c, thus reducing the speed of the piston 17c. As a result, the first rod 17a, which is integral with the piston 17c, is also decelerated, and the injection plunger 16 is decelerated, too.

With reference to FIG. 7(c), in the pressure-increasing step after the high-speed step, the restriction member 52 is moved in the receiving member 51 by inertia of pressing of the actuating member 50 and the hydraulic pressure applied from the hydraulic fluid tank 55. The block portion 52b is thus arranged at the position facing the supply port 51b. This causes the restriction member 52 to block the supply port 51b.

The supply passage of hydraulic fluid from the accumulator 22 is thus blocked by the block portion 52b, and flow of the hydraulic fluid is blocked.

Accordingly, the second embodiment has the advantages described below in addition to the same advantages as the advantages (1) to (3) of the first embodiment.

(6) The block portion 52b is formed continuously with the restriction 52a in the axial direction of the restriction member 52. Accordingly, when reactive force is applied from the mold K to the piston 17c through the first rod 17a in the pressure-increasing step, the passage permitting communication between the first chamber 17e and the accumulator 22 is blocked by the block portion 52b of the restriction member 52. The piston 17c is thus stopped from being moved by the reactive force from the mold K.

(7) The supply-and-drain mechanism R is connected to the first operation chamber 54a and the second operation chamber 54b of the receiving member 51. When the actuating member 50, which moves in conjunction with the second rod 17d, presses the restriction member 52, hydraulic fluid is supplied from the supply-and-drain mechanism R to the first operation chamber 54a to assist movement of the restriction member 52. This ensures movement of the restriction member 52 to cause the restriction 52a to restrict, or, in other words, decrease, the amount of the hydraulic fluid supplied from the accumulator 22. The injection cylinder 17 is thus reliably decelerated.

The illustrated embodiments may be modified to the forms described below.

In each of the first and second embodiments, the restriction member 44, 52 may be arranged close to the mold K when in the initial state. In this case, at the start of injection, the supply-and-drain mechanism T, R moves the restriction member 44, 52 such that the passage forming recess 44a or the restriction 52a is located at a position in the flow passage.

In the first embodiment, a valve may be mounted between the injection cylinder 17 and the receiving member 42. In this case, operation of the injection cylinder 17 is selectively started and stopped by opening or closing the valve.

In the second embodiment, a valve may be mounted between the accumulator 22 and the receiving member 51. In this case, operation of the injection cylinder 17 is selectively started and stopped by opening or closing the valve.

In the first and second embodiments, the second rod 17d may include a joint mechanism that can be selectively joined to and separated from the second rod 17d. In this case, the second rod 17d is joined to the joint mechanism in an initial state but separated from the joint mechanism when the injection cylinder 17 is started to operate. In this manner, operation of the injection cylinder 17 is controlled to be started or suspended.

In the second embodiment, the supply-and-drain mechanism R may be omitted.

In the second embodiment, the restriction 52a may be formed as continuous recesses with different depths, as in the case of the first embodiment.

In the first embodiment, the restriction may be formed in an arcuate shape as in the case of the second embodiment.

In the first embodiment, the returning member 45 formed by a coil spring is employed to return the restriction member 44 to the position where the restriction member 44 is located before being moved. However, a hydraulic pressure circuit may be connected to the receiving member 42 to return the restriction member 44 by hydraulic fluid supply using the hydraulic pressure circuit.

The injection apparatus 11 may be used in an injection apparatus that injects plastic material into the cavity 14 to mold a plastic product.

The pilot rod 32a may be mechanically connected to the drive nut N1. Alternatively, the pilot rod 32a and the drive nut N1 may be an integral component.

The invention claimed is:

1. An injection apparatus that injects molding material into a mold through an injection cylinder operated by fluid pressure of an incompressible fluid to fill the mold with the molding material, the apparatus comprising:
   a pressure accumulating portion, which is connected to an operation chamber in the injection cylinder to accumulate the fluid pressure;
   a speed reduction mechanism for reducing the speed of the injection cylinder; and
   a passage for selectively supplying and draining the incompressible fluid to and from the injection cylinder, wherein
   the injection cylinder includes a movable rod,
   a plunger is connected to the movable rod,
   the speed reduction mechanism is located outside of the injection cylinder and the plunger,
   the speed reduction mechanism includes
      an actuating member moving integrally with the rod of the injection cylinder,
      a restriction member mounted in the passage, the restriction member being movable in conjunction with movement of the actuating member, the restriction member variably restricting the passage, and
      a receiving member for movably receiving the restriction member,
   the receiving member includes a supply port connected to the passage and a drain port communicating with the supply port, and
   the restriction member has a restriction formed to restrict the passage to decrease a flow rate of the incompressible fluid from the supply port to the drain port.

2. The injection apparatus according to claim 1, further comprising a block portion that is formed in the restriction member, wherein the block portion blocks flow of the incompressible fluid by closing the passage.

3. The injection apparatus according to claim 1, wherein
   the restriction member is movable in conjunction with the actuating member while being held in contact with the actuating member,
   the restriction member is arranged in either a state before the restriction member is allowed to operate in conjunction with the actuating member or a state after the restriction member is allowed to operate in conjunction with the actuating member, and
   the injection apparatus further comprises a returning member arranged in the receiving member to return the restriction member to a position where the restriction member is located before being moved.

4. The injection apparatus according to claim 1, further comprising a supply-and-drain mechanism that is connected to the receiving member and selectively supplies and drains the incompressible fluid to move the restriction member.

5. The injection apparatus according to claim 1, wherein, when the passage is restricted by the restriction, the cross-sectional area of the passage for the incompressible fluid is smaller than both the cross-sectional area of the supply port and the cross-sectional area of the drain port.

\* \* \* \* \*